(12) United States Patent
Li et al.

(10) Patent No.: US 6,876,491 B2
(45) Date of Patent: Apr. 5, 2005

(54) HIGHLY INTEGRATED HYBRID COMPONENT FOR HIGH POWER OPTICAL AMPLIFIER APPLICATION

(75) Inventors: Yiqiang Li, San Jose, CA (US); Yongjian Wang, Saratoga, CA (US)

(73) Assignee: AC Photonics, Inc., Santa Clara, CA (US)

( * ) Notice: Subject to any disclaimer, the term of this patent is extended or adjusted under 35 U.S.C. 154(b) by 618 days.

(21) Appl. No.: 10/039,435

(22) Filed: Jan. 3, 2002

(65) Prior Publication Data
US 2003/0072075 A1 Apr. 17, 2003

Related U.S. Application Data

(60) Provisional application No. 60/329,596, filed on Oct. 15, 2001.

(51) Int. Cl.⁷ ................................................. H01S 3/00
(52) U.S. Cl. ...................... 359/341.32; 385/31; 385/47
(58) Field of Search .................. 359/341.32; 385/31, 385/39, 47

(56) References Cited

U.S. PATENT DOCUMENTS 6,185,347 B1 * 2/2001 Zheng ......................... 385/34
6,628,455 B1 * 9/2003 Lee ......................... 359/341.32
6,643,058 B2 * 11/2003 Pianciola et al. ........ 359/341.3

FOREIGN PATENT DOCUMENTS

EP          001113307 A2 *    7/2001

* cited by examiner

Primary Examiner—Mark Hellner
(74) Attorney, Agent, or Firm—Sawyer Law Group LLP

(57) ABSTRACT

A method and system for providing a highly integrated hybrid component is disclosed. The method and system include providing a triple fiber collimator, a dual isolator/polarization beam deflector and a dual fiber collimator. The triple fiber collimator receives a plurality of pump signals in a first direction and outputs an optical signal in a second direction. The dual isolator/polarization beam deflector is optically coupled to the triple fiber collimator. The dual isolator/polarization beam deflector transmits the pump signals in the first direction, prevents a portion of the pump signals from traveling out of the triple-fiber collimator in the second direction, provides the optical signal in the second direction and prevents a portion of the optical signal from traveling out of the dual fiber collimator in the first direction. The dual fiber collimator receives the optical signal traveling in the second direction and outputs the pump signals traveling in the first direction. Moreover, a partial reflection plate, which reflects a portion of the optical signal to provide a signal tap, may be provided between the dual fiber collimator and the dual isolator/polarization beam deflector.

20 Claims, 11 Drawing Sheets

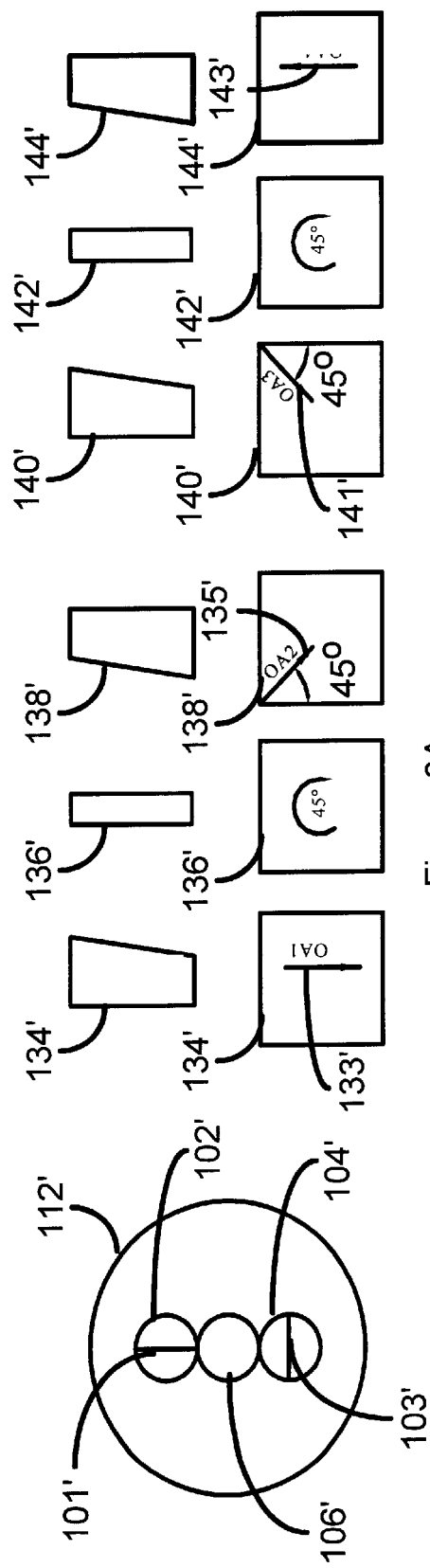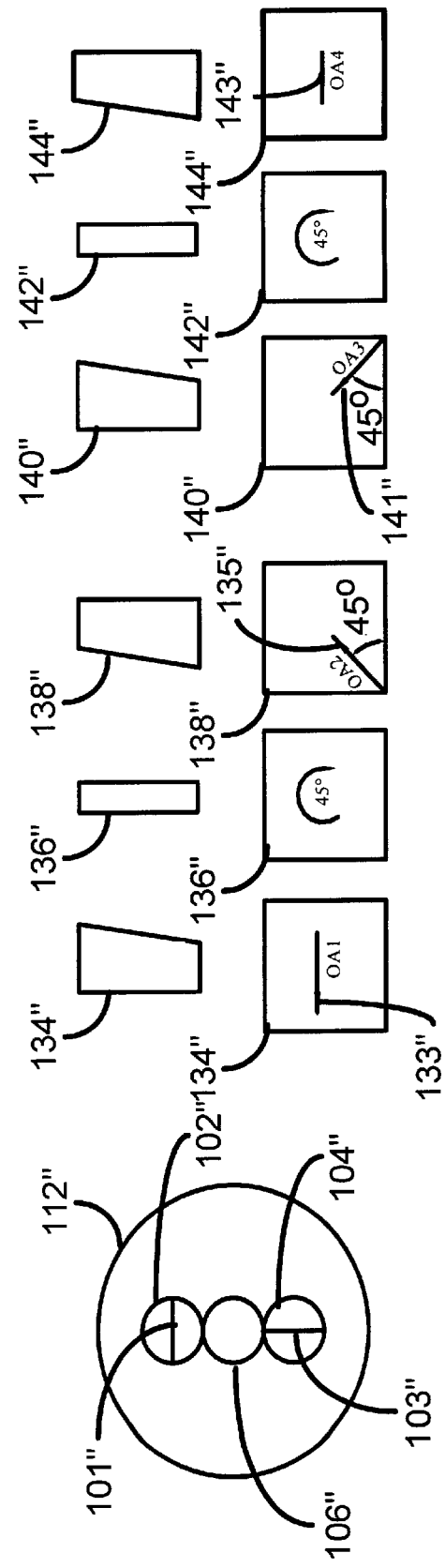
Figure 8A
Figure 8B

HIGHLY INTEGRATED HYBRID COMPONENT FOR HIGH POWER OPTICAL AMPLIFIER APPLICATION

CROSS-REFERENCE TO RELATED APPLICATION

This application is claiming under 35 U.S.C. §119(e) the benefit of provisional patent application Ser. No. 60/329,596, filed Oct. 15, 2001.

FIELD OF THE INVENTION

The present invention relates to optical systems, and more particularly to a method and system for providing a component for high power optical amplifiers.

BACKGROUND OF THE INVENTION

In fiber optic communication, the optical signal propagates inside an optical fiber. Due to the nature of optical fibers, optical signal attenuation always exists. To overcome this signal attenuation in long distance communication systems, optical signal amplification using an optical amplifier is required. Both Erbium Doped Fiber Amplifier (EDFA) or Raman Amplifier can be utilized as the optical amplifier. In order for the optical signal to propagate a longer distance, an optical amplifier with high output power is preferred. FIG. 1 depicts a conventional optical amplifier system 10 for use in high power optical amplification applications. The conventional optical amplifier system 10 includes a wavelength division multiplexer ("WDM") 14, a first isolator 18, a polarization beam combiner ("PBC") 22, a second isolator 34 and a tap 38. Also depicted are pump laser sources 28 and 30, which provide a pump signal typically somewhere in the 1400 nm to 1500 nm range, and that are used to amplify the input signal 12 that is input.

The conventional optical amplifier system 10 takes the outputs from the pump lasers 28 and 30 via fibers 24 and 26, respectively and combines the outputs via the PBC 22 so that higher pump power is obtained. The combined pump output 20 is provided to the first isolator 18, which prevents back reflections from reaching the lasers 28 and 30. The isolated pump output 16 of the first isolator 18 is combined with the signal 12 using the WDM 14. Thus, the signal is amplified. The output 32 of the WDM 14 is provided to the second isolator 34, which also precludes signal back reflection. The output 36 of the second isolator 34 is provided to the signal tap 38. The signal tap 38 provides an output signal 40 as well as a tap 42 to be taken from the output signal 40. The tap 42 allows the signal output 40 to be monitored.

Although the conventional optical amplifier system 10 functions, one of ordinary skill in the art will readily recognize that there are a large number (five) discrete components used: the WDM 14, the first isolator 18, the PBC 22, the second isolator 34 and the signal tap 38. Because of the large number of components used, more fusion splicing is required to fabricate the conventional optical amplifier system 10. Consequently, the insertion loss for both the amplified signal and the pump power from the pump lasers 28 and 30 is increased. The performance of the amplifier system will thus be degraded. Furthermore, assembly of the conventional optical amplifier system 10 is made more difficult due to the large number of components. Moreover, the cost of the conventional optical amplifier system 10 is substantially increased because of the large number of components used.

Accordingly, what is needed is an optical amplifier system and method which is more integrated and which amplifies an optical signal. The present invention addresses such a need.

SUMMARY OF THE INVENTION

The present invention provides method and system for providing a highly integrated hybrid component for high power optical amplification applications. The method and system comprise providing a triple fiber collimator, a dual isolator/polarization beam deflector and a dual fiber collimator. The triple fiber collimator receives a plurality of pump signals in a first direction and outputs an optical signal in a second direction. The dual isolator/polarization beam deflector is optically coupled to the triple fiber collimator. The dual isolator/polarization beam deflector transmits the plurality of pump signals in the first direction, prevents a portion of the plurality of pump signals from traveling from the dual isolator/polarization beam deflector in the second direction, provides the optical signal in the second direction and prevents a portion of the optical signal from traveling from the dual isolator/polarization beam deflector in the first direction. The dual fiber collimator receives the optical signal traveling in the second direction and outputs the plurality of pump signals traveling in the first direction.

According to the system and method disclosed herein, the present invention provides a hybrid component that is highly integrated, utilizing fewer components.

BRIEF DESCRIPTION OF THE DRAWINGS

FIG. 8A is a diagram of the optical alignment of one preferred embodiment of a dual isolator/polarization beam deflector in accordance with the present invention.

FIG. 8B is a diagram of the optical alignment of a second preferred embodiment of a dual isolator/polarization beam deflector in accordance with the present invention.

DETAILED DESCRIPTION OF THE INVENTION

The present invention relates to an improvement in optical amplifier systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides method and system for providing a highly integrated hybrid component. The method and system comprise providing a triple fiber collimator, a dual isolator/polarization beam deflector and a dual fiber collimator. The triple fiber collimator receives a plurality of pump signals in a first direction and outputs an optical signal in a second direction. The dual isolator/polarization beam deflector is optically coupled to the triple fiber collimator. The dual isolator/polarization beam deflector transmits the plurality of pump signals in the first direction, prevents a portion of the plurality of pump signals from traveling from the dual isolator/polarization beam deflector in the second direction, provides the optical signal in the second direction and prevents a portion of the optical signal from traveling from the dual isolator/polarization beam deflector in the first direction. The dual fiber collimator receives the optical signal traveling in the second direction and outputs the plurality of pump signals traveling in the first direction.

For clarity, the present invention will be described in terms of signals traveling in a first direction and a second direction. However, one of ordinary skill in the art will readily recognize that the signals travel generally in the first and second directions, but are typically deflected to a certain extent. Thus, a signal described as traveling in the first direction need not always be exactly parallel to a first direction. Instead, some component of the direction of travel of the signal is in the first direction. Similarly, a signal described as traveling in the second direction need not always be exactly parallel to the second direction. Instead, some component of the direction of travel of the signal is in the second direction. Furthermore, the present invention is described in the context of particular components. However, one of ordinary skill in the art will readily recognize the system and method are consistent with other components having similar functions. Moreover, the present invention is described in the context of optical and pump signals being provided to various components. However, one of ordinary skill in the art will readily recognize that there are some losses in the signals during operation.

Figure 1:
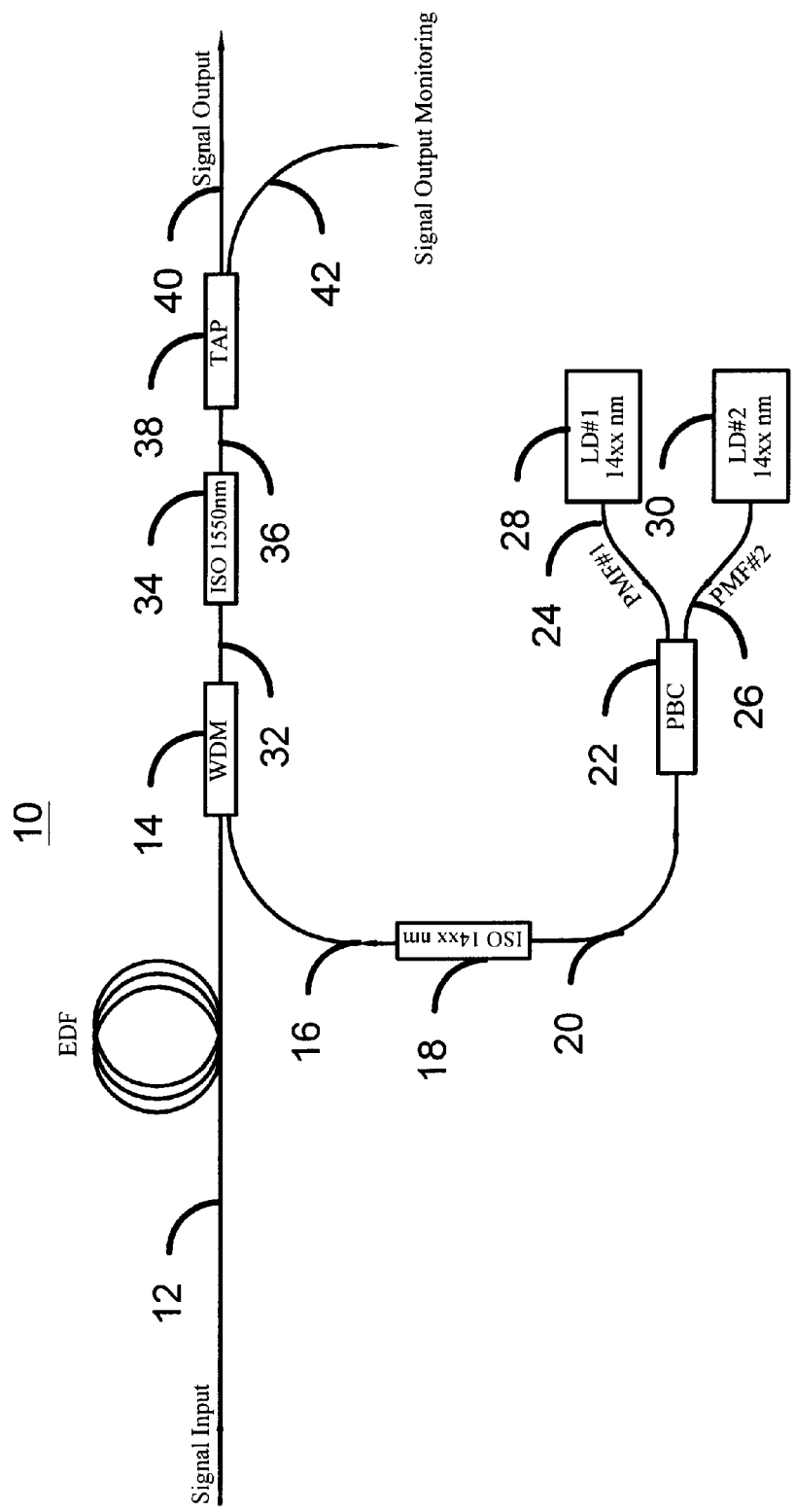
FIG. 1 is a diagram of a conventional amplifier system with discrete component.
Figure 2:
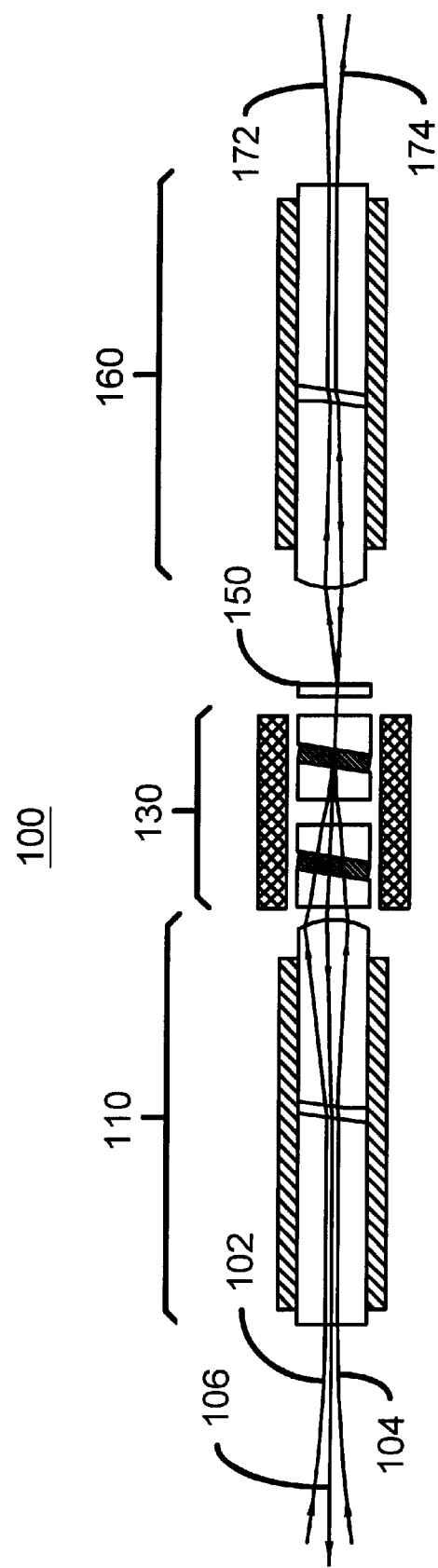
FIG. 2 is a diagram of one embodiment of a highly integrated hybrid component in accordance with the present invention.

To more particularly illustrate the method and system in accordance with the present invention, refer now to FIG. 2, depicting one embodiment of a highly integrated hybrid component 100 in accordance with the present invention. The highly integrated hybrid component 100 includes a triple fiber collimator 110, a dual isolator/polarization beam deflector 130, a partial reflection plate 150 and a dual fiber collimator 160. The triple fiber collimator 110 and the dual fiber collimator 160 preferably use C-lenses (manufactured by CASIX, Fuzhou, P. R. China) or an aspherical lens. The dual isolator/polarization beam deflector transmits a portion of the pump signal traveling in a first direction (generally toward the right in FIG. 2) and to transmit the optical signal in a second direction (generally to the left in FIG. 2). The dual isolator/polarization beam deflector also prevents reflections of the pump signals, described below, and the optical signal input from being transmitted in the first and second directions, respectively. The partial reflection plate 150 is used to transmit most of the optical signal, but also to reflect a small portion of the signal back to the signal tap fiber 172. Thus, a signal tap is provided to allow the optical signal to be monitored.

An optical signal is input to the highly integrated hybrid component 100 using the signal input/pump output fiber 174. The dual fiber collimator 160 collimates the optical signal and provides the optical signal to the partial reflection plate 150. The partial reflection plate transmits a majority of the optical signal (hereinafter still termed the "optical signal") and reflects a portion of the optical signal back to the dual fiber collimator 160. The reflected optical signal is a signal tap that is provided to the signal tap fiber 172 for monitoring. The signal tap fiber 172 is preferably a single mode fiber. Operation of the dual fiber collimator 160 is discussed further below. The partial reflection plate 150 provides the optical signal to the dual isolator/polarization beam deflector 130.

Similarly, pump signals are provided to the hybrid highly integrated component 100 via the pump input fibers 102 and 104. The pump input fibers 102 and 104 are preferably polarization maintaining (PM) fibers. The pump signals are collimated by the triple fiber collimator 110. The triple fiber collimator 110 provides the pump signals to the dual isolator/polarization beam deflector 130. The dual isolator/polarization beam deflector 130 prevents back reflections of the pump signals from being provided back to the pump input fibers 102 and 104. Similarly, the dual isolator/polarization beam deflector 130 prevents the optical signal from being reflected back to the signal input fiber 174 or the signal tap 172 of the dual fiber collimator 160. The dual isolator/polarization beam deflector 130 also deflects the pump signals to be output through the fiber 174. Similarly, the dual isolator/polarization beam deflector 130 deflects the optical signal to be collimated by the dual fiber collimator 160 and output on the fiber 106.

To more particularly describe the operation of the highly integrated hybrid component 100, preferred embodiments of the triple fiber collimator 110, the dual isolator/polarization beam deflector 130 and the dual fiber collimator 160 are separately described below.

Figure 3A:
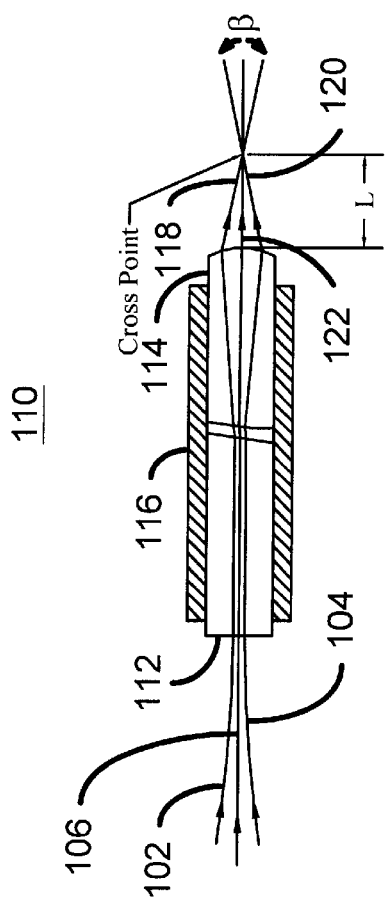
FIG. 3A is a side view of one embodiment of a triple fiber collimator in accordance with the present invention.
Figure 3B:
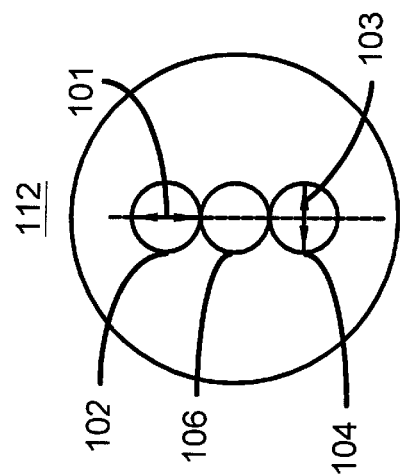
FIG. 3B depicts an end view of one embodiment of the triple fiber pigtail in accordance with the present invention.

FIG. 3A is a side view of one embodiment of a triple fiber collimator 110 in accordance with the present invention. FIG. 3B depicts an end view of one embodiment of the triple fiber pigtail in accordance with the present invention. The triple fiber collimator 110 includes a triple fiber pigtail capillary 112, a C lens 114 held in a glass tube 116. The triple fiber pigtail capillary 112 holds fibers 102, 104 and 106. The fiber 106 is preferably a single mode fiber, while the fibers 102 and 104 are preferably PM fibers. In a preferred embodiment, the single mode fiber 106 is in the center of the fibers 102 and 104. The three beams 118, 120 and 122 are collimated such that, in the absence of other components, the beams 118, 120 and 122 would cross at a distance L from the closest point on the front of the C-lens 114. The point at which the beams 118, 120 and 122 cross is defined as the cross point. The distance L is the crossing distance. The crossing distance is preferably approximately 2~3 mm. In addition, the beams 118 and 122 are separated by an angle, β, known as the beam separation angle. The beam separation angle is preferably approximately 4°~8°.

Figure 4A:
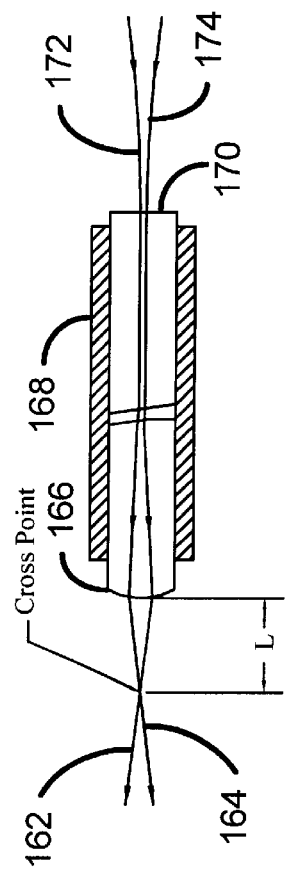
FIG. 4A is a side view of one embodiment of a dual fiber collimator in accordance with the present invention.
Figure 4B:
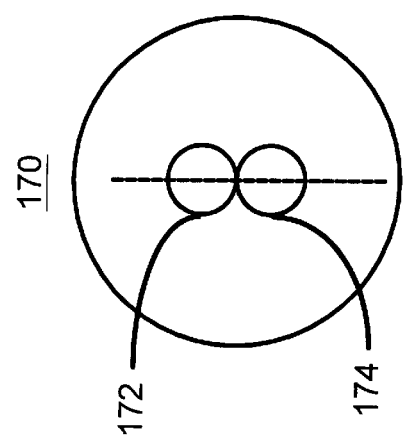
FIG. 4B depicts an end view of one embodiment of the dual fiber pigtail in accordance with the present invention.

FIGS. 4A and 4B depict one embodiment of the dual fiber collimator 160 in accordance with the present invention. FIG. 4A is a side view of one embodiment of a dual fiber collimator 160 in accordance with the present invention. FIG. 4B depicts an end view of one embodiment of the dual fiber pigtail 160 in accordance with the present invention. The dual fiber collimator 160 includes a c-lens (or aspherical lens) 166 and a dual fiber pigtail capillary 170. The dual fiber pigtail capillary 170 holds two fibers 172 and 174. The fibers 172 and 174 are preferably single mode fibers. The two beams 162 and 164 are collimated such that, in the absence of other components, the beams 162 and 164 would cross at a distance L from the closest point on the front of the C-lens 166. The point at which the beams 162 and 164 cross is defined as the cross point. The distance L is the crossing distance. The crossing distance is preferably 2~3 mm. In addition, the beams 162 and 164 are separated by an angle, β, known as the beam separation angle. The beam separation angle is preferably approximately 2°~4°.

FIGS. 4A and 4B depict one embodiment of the dual fiber collimator 160 in accordance with the present invention. FIG. 4A is a side view of one embodiment of a dual fiber collimator 160 in accordance with the present invention. FIG. 4B depicts an end view of one embodiment of the dual fiber pigtail 160 in accordance with the present invention. The dual fiber collimator 160 includes a C-lens (or aspherical lens) 166 and a dual fiber pigtail capillary 170. The dual fiber pigtail capillary 170 holds two fibers 172 and 174. The fibers 172 and 174 are single mode fibers. The two beams 162 and 164 are collimated such that, in the absence of other components, the beams 162 and 164 would cross at a distance L from the closest point on the front of the C-lens 166. The point at which the beams 162 and 164 cross is defined as the cross point, and the distance L is defined as the crossing distance. The crossing distance is preferably approximately 2~3 mm. In addition, the beams 162 and 164 are separated by an angle, β/2, known as the beam separation angle. The beam separation angle is preferably approximately 2°~4°.

Figure 5:
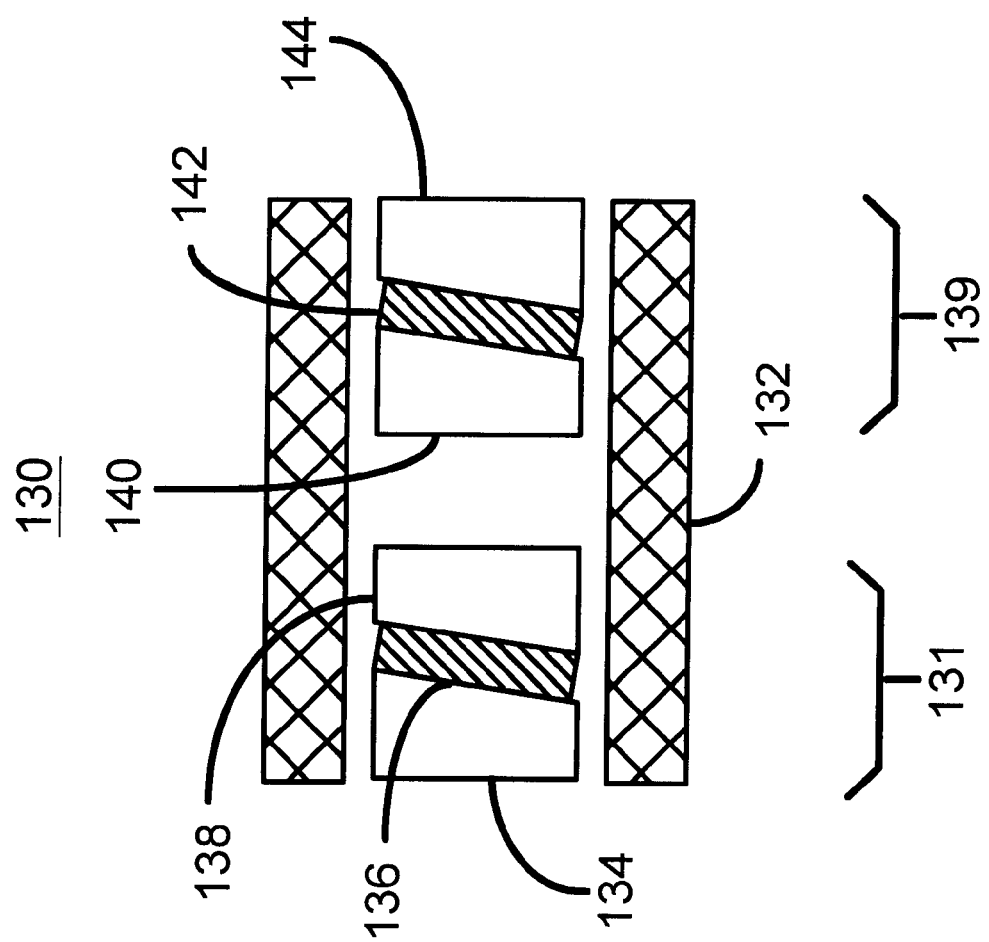
FIG. 5 is a diagram of one embodiment of a dual isolator/polarization beam deflector in accordance with the present invention.

FIG. 5 is a diagram of one embodiment of a dual isolator/polarization beam deflector 130 in accordance with the present invention. The dual isolator/polarization beam deflector 130 includes two isolator-polarization beam deflectors 131 and 139. The first isolator-polarization beam deflector 131 includes a first birefringent wedge 134, a first rotator 136 and a second birefringent wedge 138. The second isolator-polarization beam deflector 139 includes a third birefringent wedge 140, a second rotator 142 and a fourth birefringent wedge 144. The dual isolator/polarization beam deflector 130 also includes a magnetic ring 132. The rotators 136 and 142 are preferably Faraday rotators.

Figure 6:
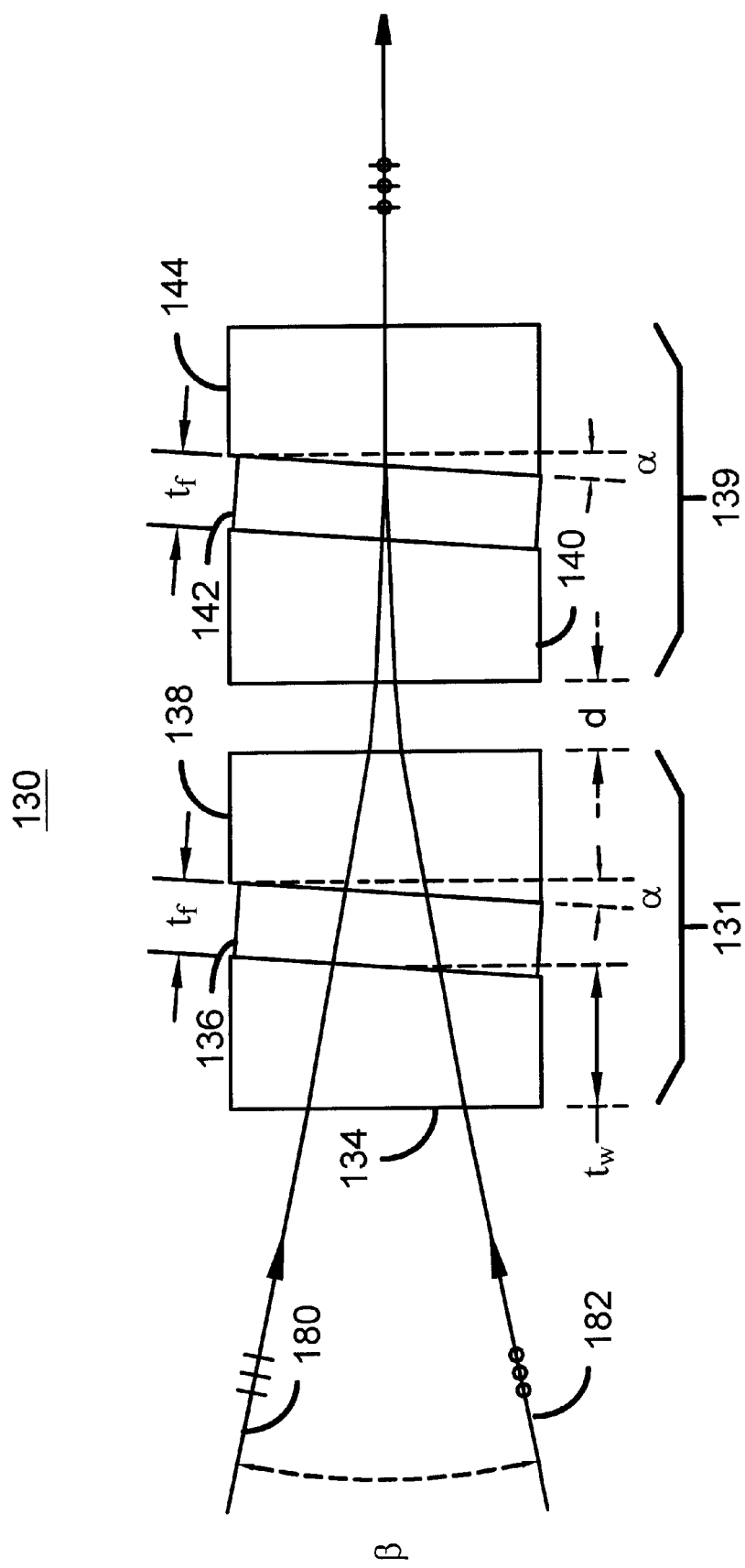
FIG. 6 is another diagram of one embodiment of a dual isolator/polarization beam deflector in accordance with the present invention.

FIG. 6 is another diagram depicting the angle for of one embodiment of a dual isolator/polarization beam deflector 130 in accordance with the present invention. The birefringent wedges 134, 138, 140 and 142 each has an angle, α. Because the birefringent wedges 134, 138, 140 and 142 are composed of birefringent material, such as $YVO_4$, Rutile or $LiNbO_3$, the index of refraction in the direction of the optical axis is $n_e$, while the index of refraction in a direction perpendicular to the optical axis is $n_o$. The optical axis of the second birefringent wedge 138 is 45° from the optical axis of the first birefringent wedge 134. The optical axis of the fourth birefringent wedge 142 is 45° from the optical axis of the third birefringent wedge 140. The optical axis of the third birefringent wedge 140 is 90° from the optical axis of the second birefringent wedge 138. Furthermore, as described above, the angular separation of the pump signals 180 and 182 from the triple fiber collimator 110 have an angular separation, β. The birefringent wedges 134, 138, 140 and 142 each has a thickness of $t_w$ at its center. The isolator-polarization beam deflectors 131 and 139 are separated by a distance, d. In order for the dual isolator/polarization beam deflector 130 to function as desired, the angular separation follows the following relationship:

$$\beta = 2\sin^{-1}(n_e \sin(\sin^{-1}(n_o/n_e \sin \alpha) - \alpha)) - 2\sin^{-1}(n_o \sin(\sin^{-1}(n_e/n_o \sin \alpha) - \alpha)) \quad (1)$$

In addition, the crossing distance, L, described above satisfies the following relationship:

$$L > (3t_w/n + 2t_f/n_f + d) \quad (2)$$

Where n is the smaller of $n_e$ and $n_o$ and where $n_f$ is the index of refraction of the rotator 136 or 142.

Figure 7:
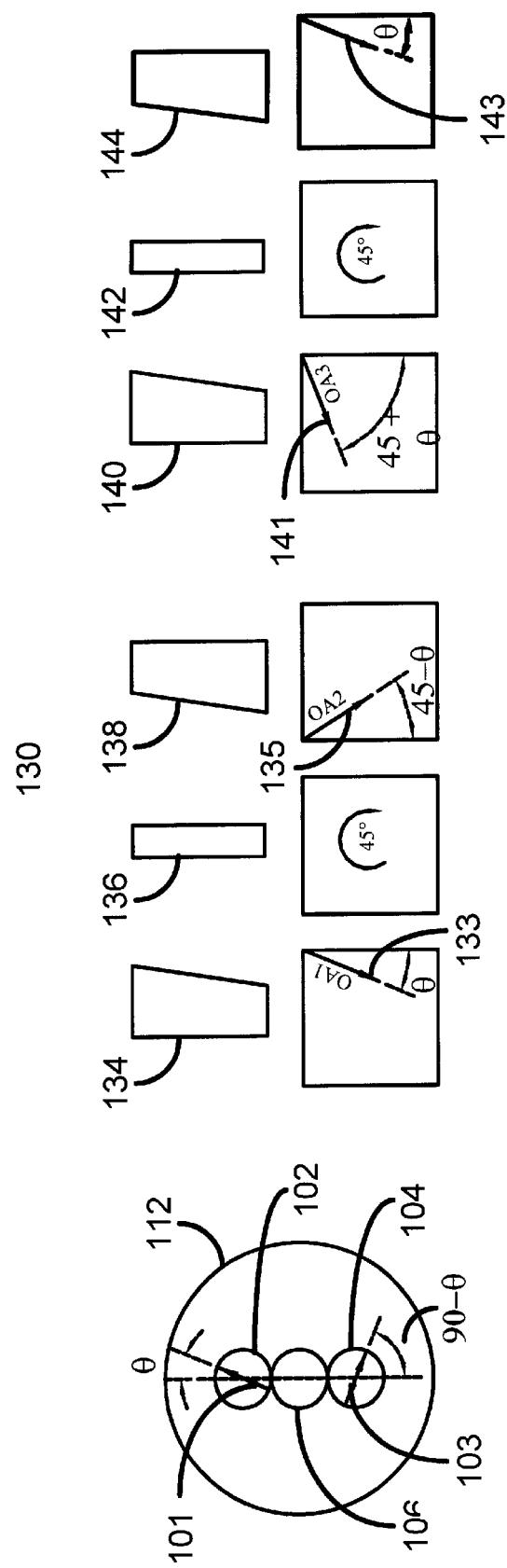
FIG. 7 is a diagram of the optical alignment one embodiment of a portion of the dual isolator/polarization beam deflector in accordance with the present invention.

FIG. 7 is a diagram of the generalized optical alignment of one embodiment of a portion of the dual isolator/polarization beam deflector 130 in accordance with the present invention. Also shown is the triple fiber pigtail capillary 112. The pump signals in fibers 102 and 104 have polarizations 101 and 103. The polarization 101 is at an angle, θ, clockwise from vertical. The polarization in the fiber 104 is at an angle of 90°−θ counterclockwise from vertical. The optical axis 133 of the first birefringent wedge 134 is at an angle of θ clockwise from vertical, as shown in FIG. 7. The rotator 136 rotates the polarizations of the pump and optical signals by 45° clockwise. The optical axis 135 of the second birefringent wedge 138 is at an angle of 45°−θ counterclockwise from vertical. The optical axis 135 of the second birefringent wedge 138 is thus 45° from the optical axis of the first birefringent wedge 134. The optical axis 141 of the third birefringent wedge 140 is at an angle of 45°+θ clockwise from vertical. Thus, the optical axis 141 of the third birefringent wedge 140 is 90° from the optical axis 135 of the second birefringent wedge 138. The optical axis 143 of the fourth birefringent wedge 144 is at an angle of θ clockwise from vertical. The optical axis 143 of the fourth birefringent wedge 144 is thus 45° from the optical axis 141 of the third birefringent wedge 140.

FIG. 8A is a diagram of the optical alignment of one preferred embodiment of a dual isolator/polarization beam deflector 130' in accordance with the present invention. Also depicted is a preferred embodiment of the triple fiber pigtail capillary 112'. The pump signals in fibers 102' and 104' have polarizations 101' and 103'. The polarization 101' is vertical. The polarization in the fiber 104' is horizontal. The optical axis 133' of the first birefringent wedge 134' is vertically up. The rotator 136' rotates the polarizations of the pump and optical signals by 45° clockwise. The optical axis 135' of the second birefringent wedge 138' is at an angle of 45° counterclockwise from vertically down. The optical axis 135' of the second birefringent wedge 138' is thus 45° from the optical axis 133' of the first birefringent wedge 134'. The optical axis 141' of the third birefringent wedge 140' is at an angle of 45° clockwise from vertically down. The optical axis 141' of the third birefringent wedge 140' is thus 90° from the optical axis 135' of the second birefringent wedge 138'. The optical axis 143' of the fourth birefringent wedge 144' is vertically down. The optical axis 143' of the fourth birefringent wedge 144' is thus 45° from the optical axis 141' of the third birefringent wedge 140'.

FIG. 8B is a diagram of the optical alignment of a second preferred embodiment of a dual isolator/polarization beam deflector 130" in accordance with the present invention. Also depicted is a second preferred embodiment of the triple fiber pigtail capillary 112". The pump signals in fibers 102" and 104" have polarizations 101" and 103". The polarization 101" is horizontal. The polarization in the fiber 104" is vertical. The optical axis 133" of the first birefringent wedge 134" is horizontally left. The rotator 136" rotates the polarizations of the pump and optical signals by 45° clockwise. The optical axis 135" of the second birefringent wedge 138" is at an angle of 45° counterclockwise from horizontally right. The optical axis 135" of the second birefringent wedge 138" is thus 45° from the optical axis 133" of the first birefringent wedge 134". The optical axis 141" of the third birefringent wedge 140" is at an angle of 45° clockwise from horizontally left. Thus, the optical axis 141" of the third birefringent wedge 140" is 90° from the optical axis 135" of the second birefringent wedge 138". The optical axis 143" of the fourth birefringent wedge 144" is horizontally right. The optical axis 143" of the fourth birefringent wedge 144" is thus 45° from the optical axis 141" of the third birefringent wedge 140".

Figure 9A:
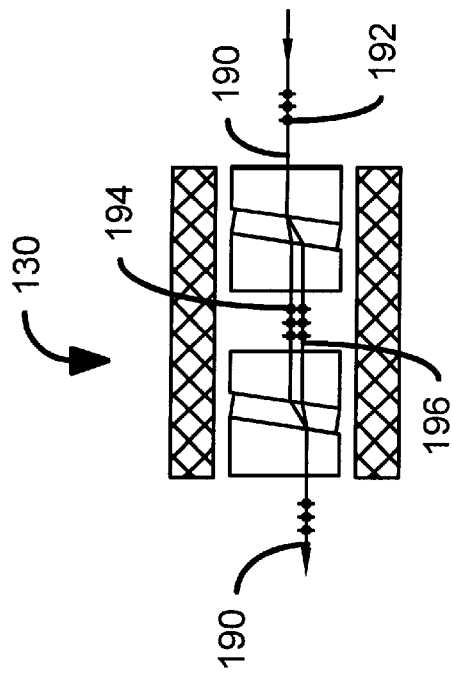
FIG. 9A is a diagram of the optical and pump signal paths in the forward direction for one embodiment of a dual isolator/polarization beam deflector in accordance with the present invention.
Figure 9A:
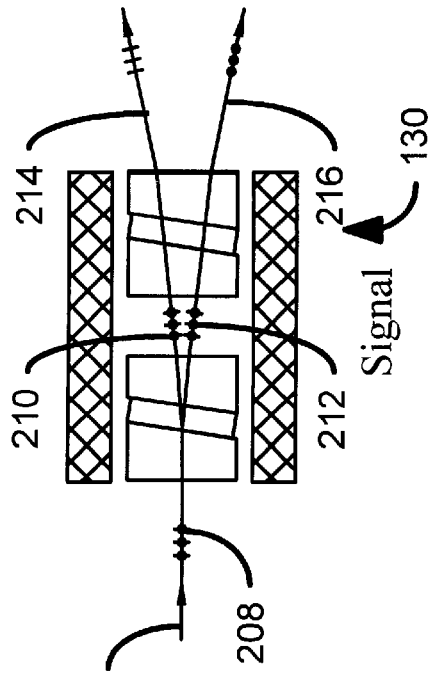

FIG. 9A is a diagram of the optical and pump signal paths in the forward direction for one embodiment of a dual isolator/polarization beam deflector 130 in accordance with the present invention. The forward direction for the pump signal is the first direction, to the right in FIG. 9A. However, the forward direction for the optical signal is in the second direction, to the left in FIG. 9A. The pump signals 180 and 182 having a separation angle $\beta$ are received from the triple fiber collimator 10 (not shown in FIG. 9A). The polarization 181 of the pump signal 180 is essentially vertical, while the polarization 183 of the pump signal 182 is horizontal (out of the plane of the page in FIG. 9A). The pump signal 180 is the extraordinary ray and thus experiences an index of refraction of $n_e$ while passing through the first birefringent wedge 134. The polarization 181 of pump signal 180 is then rotated by 45° by the rotator 136. The pump signal 180 is thus the ordinary ray for the second birefringent wedge 138. Thus, the pump signal 180 experiences and index of refraction of $n_o$ while passing through the second birefringent wedge 138. Similarly, the pump signal 180 is the extraordinary ray for the third birefringent wedge 140, and the ordinary ray for fourth birefringent wedge 144. Choosing $n_e > n_o$, and assuming the relationship between the pump signals separation angle $\beta$ and the wedge angle $\alpha$ satisfy equation (1), then after the first isolator-polarization beam deflector 131 the pump signal 180 is deflected up by the angle $\beta/4$, and after the second isolator-polarization beam deflector 139 the pump signal 180 is deflected up by another $\beta/4$. Thus, the pump signal 180 exits the dual isolator/polarization beam deflector 130 is totally deflected up by $\beta/2$, and is, therefore, traveling horizontally.

Similarly, the pump signal 182 is the ordinary ray and thus experiences an index of refraction of $n_o$ while passing through the first birefringent wedge 134. The polarization 183 of pump signal 182 is then rotated by 45° by the rotator 136. The pump signal 182 is thus the extraordinary ray for the second birefringent wedge 138. Thus, the pump signal 182 experiences and index of refraction of $n_e$ while passing through the second birefringent wedge 138. Similarly, the pump signal 182 is the ordinary ray for the third birefringent wedge 140, and the extraordinary ray for fourth birefringent wedge 144. After the first isolator-polarization beam deflector 131 the pump signal 182 is deflected down by the angle $\beta/4$, and after the second isolator-polarization beam deflector 139 the pump signal 182 is deflected down by another $\beta/4$. Thus, the pump signal 182 exits the dual isolator/polarization beam deflector 130 is deflected down by a total of $\beta/2$, and is, therefore, traveling horizontally. Moreover, because the crossing distance, L, described above satisfies the relationship $$L > (3t_w/n + 2t_f/n_f + d)$$

The pump signals 180 and 182 from the fibers 102 and 104, respectively, can be crossed at the interface between the rotator 142 and the fourth birefringent wedge 146 by adjusting the relative positions of the triple fiber collimator 110 and the dual isolator/polarization beam deflector 130. Thus, the pump signals 180 and 182 are combined and output via the dual fiber collimator 160.

FIG. 9A also depicts the path of the optical signal 190 as it travels forward in the second direction, to the left in FIG. 9A. The optical signal 190 has a polarization 192 that can be decomposed into a vertical portion and a horizontal portion (out of the plane of the page in FIG. 9A). When the optical signal signal 190 having an arbitrary polarization state 192 enters the second isolator-polarization beam deflector 139, it is polarized into ordinary and extraordinary rays by the fourth optical birefringent wedge 144. The extraordinary ray experiences an index of refraction of $n_e$ in the fourth optical birefringent wedge 144. The polarization of the extraordinary ray is rotated 45° clockwise by the rotator 142. The extraordinary ray then experiences index of refraction of $n_e$ in the third optical birefringent wedge 140. When the extraordinary ray enters the first isolator-polarization beam deflector 131, it experiences index of refraction of $n_o$ in the second optical birefringent wedge 138. The polarization of the extraordinary ray is then rotated 45° clockwise by the rotator 136. The extraordinary ray then experiences index of refraction of $n_o$ in the first optical birefringent wedge 134. Under the conditions of Equation (1), the extraordinary ray is angularly un-deflected but walked-off from its original propagation direction.

Similarly, the ordinary ray experiences an index of refraction of $n_o$ in the fourth optical birefringent wedge 144, has its polarization direction is rotated 45° clockwise by the rotator 142, and then experiences index of refraction of $n_o$ in the third optical birefringent wedge 140. When the ordinary ray enters into the first isolator-polarization beam deflector 131, it experiences index of refraction of $n_e$ in the second optical birefringent wedge 138. The polarization of the ordinary ray is then rotated 45° clockwise by the rotator 136. The ordinary ray then experiences index of refraction of $n_e$ in the first optical birefringent wedge 134. Under the conditions of Equation (1), the ordinary ray is angularly un-deflected but walked-off from its original propagation direction by the same amount as that of extraordinary ray. Since the ordinary and extraordinary rays have the same amount of walk-off, the optical signal 190 is split into two optical signals 194 and 196 as it travels through the second isolator-polarization beam deflector 139. The optical signals 194 and 196 are recombined into optical signal 190 by the first isolator-polarization beam deflector 131. In addition, the optical signal 190 will be collimated by the triple fiber collimator 110 and provided to the fiber 106 for outputting.

Because there is no spatial separation between ordinary and extraordinary ray in the combined optical signal 190, the coupling polarization dependent loss (PDL) is minimized. In addition, the optical phase delays for ordinary and extraordinary rays are the same when they pass through the dual isolator/polarization beam deflector 130. Consequently, the polarization mode dispersion (PMD) is eliminated.

Moreover, the amount of walk-off introduced by the dual isolator/polarization beam deflector 130 for optical signal 190 is approximately in the order of 5 to 10 μm, which is too small to introduce any insertion loss increase.

Figure 9B:
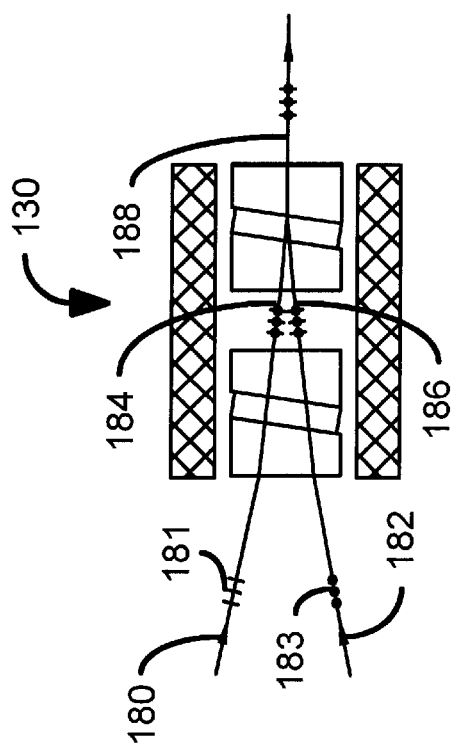
FIG. 9B is a diagram of the optical and pump signal paths in the backward direction for one embodiment of a dual isolator/polarization beam deflector in accordance with the present invention.
Figure 9B:
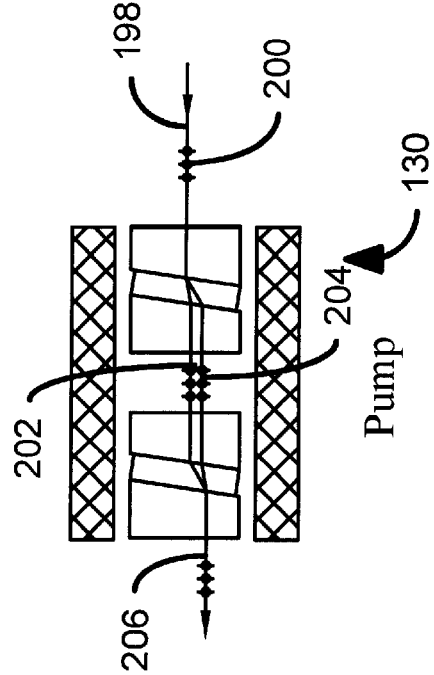

FIG. 9B is a diagram of the optical signal path in the backward direction for one embodiment of a dual isolator/polarization beam deflector 130 in accordance with the present invention. The backward direction for the pump signal is the second direction, to the left in FIG. 9B. However, the backward direction for the optical signal is in the first direction, to the right in FIG. 9B. The polarization 200 of the reflected pump signal 198 has both vertical and horizontal components. The reflected pump signal 198 is split into two reflected pump signals 202 and 204 as the reflected pump signal 198 travels through the second isolator-polarization beam deflector 139. The reflected pump signals 202 and 204 are recombined into reflected pump signal 198 by the first isolator-polarization beam deflector 131. The combined reflected pump signal 198 is angled, typically at an angle of 1.5°, with the beams coming from PM fibers 102 and 104 of the triple fiber collimator 110. Because the coupling efficiency of the triple fiber collimator 110 is highly angular sensitive, the back reflected pump signal 198 will not be provided to any of the PM fibers 102 and 104 of the triple fiber collimator 110. Therefore, a backward isolation of the pump signal 198 is achieved.

FIG. 9B also depicts the path of the reflected optical signal 206 as it travels backward in the first direction, to the right in FIG. 9B. The reflected optical signal 206 has a polarization 208 that can be decomposed into a vertical portion and a horizontal portion (out of the plane of the page in FIG. 9B). The reflected optical signal 206 is split into two optical signals 210 and 212 as the reflected optical signal 206 travels through the first isolator-polarization beam deflector 131. The reflected optical signals 210 and 212 are further split by the second isolator-polarization beam deflector 139 into reflected optical signals 214 and 216. The reflected optical signals 214 and 216 are angled, typically by and angle 1.5°, with the optical signal coming out from the fiber 174 of dual fiber collimator 160. Because the coupling efficiency of the dual fiber collimator 160 is highly angular sensitive, the reflected signal 206 will not be provided into the fiber 174 of dual fiber collimator 160. Therefore, backward isolation on the optical signal is achieved.

Figure 10:
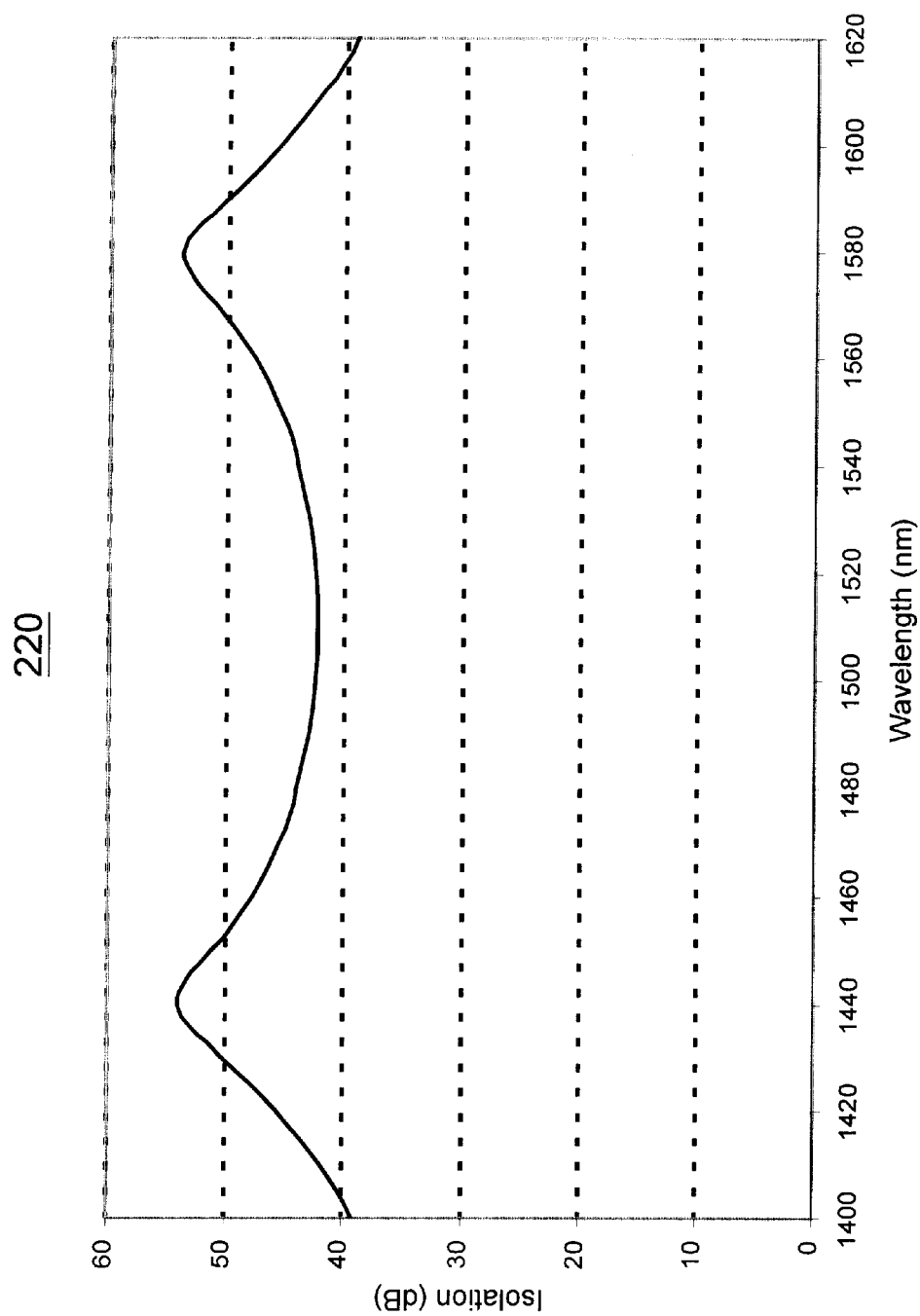
FIG. 10 is a diagram of the isolation provided by one embodiment of a highly integrated hybrid component in accordance with the present invention.

Because of the wavelength dependency of the polarization rotation angle for rotators 136 and 142, the isolation bandwidth for both the-optical signal and the pump signal is limited by isolator-polarization beam deflector 131 and 139. In the dual isolator/polarization beam deflector 130, the isolator-beam deflectors 131 and 139 form a double stage isolator so that a much wider isolation bandwidth with higher isolation can be achieved. FIG. 10 is a graph 220 depicting the isolation provided by one preferred embodiment of a highly integrated hybrid component in accordance with the present invention having the peak isolation of each isolator-polarization beam beam deflector 131 and 139 set to 1440 nm and 1580 nm, respectively. The graph 220 shows that a 200 nm isolation bandwidth with greater than 40 dB isolation is achieved. Moreover, the isolation covers the entire pump power band (1400 nm to 1500 nm) and entire C-band plus the L-band for the optical signal. However, in an alternate embodiment, another isolation spectrum can be achieved using rotators 136 and 142 by setting the peak isolation wavelengths of isolator/polarization beam deflectors 131 and 139 to some other desired values.

Figure 11:
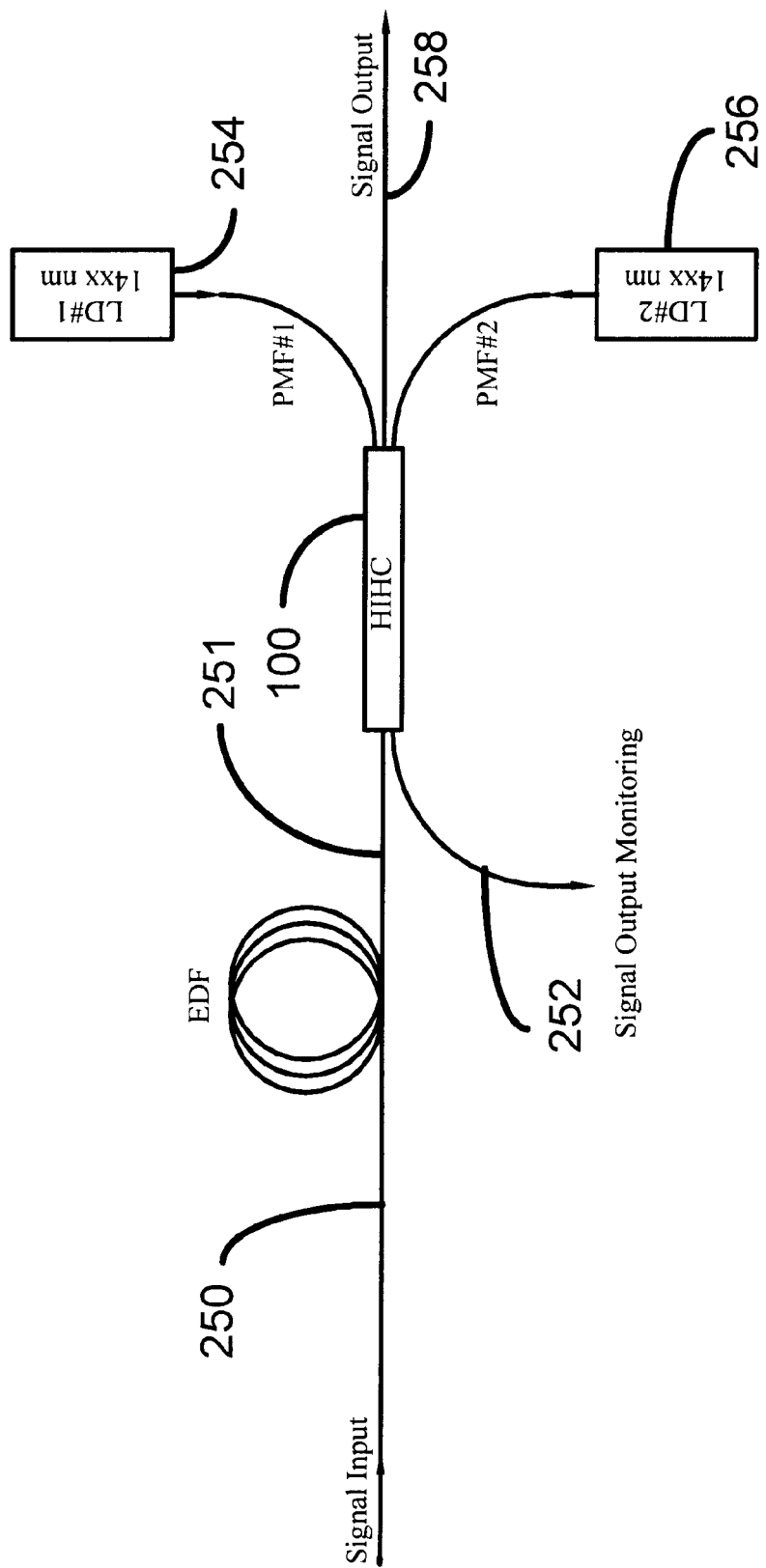
FIG. 11 is a diagram of one embodiment of an optical system using an highly integrated hybrid component in accordance with the present invention as used in an application.

FIG. 11 is a diagram of one embodiment of highly integrated hybrid component 100 in accordance with the present invention as used in a high power optical amplifier application, for example a counter pumped EDFA or a Raman amplifier. The optical signal input over the fiber 250 and amplified. The amplified optical signal is provided on fiber 251, which is connected to the optical signal input of the highly integrated hybrid component 100. The tap of amplified optical signal will be provided on fiber 252. The pump signals are input from pump lasers 254 and 256 and provided on fiber 251. The amplified optical signal provided on fiber 251 is output via fiber 258. In addition, the highly integrated hybrid component 100 prevents back reflections of optical signals provided on the fiber 258 from reaching the fiber 251. The highly integrated hybrid component 100 also prevents back reflections of pump signals provided on fiber 251 from reaching pump lasers 254 and 256.

Thus, the optical amplifier system using highly integrated hybrid component 100 uses much fewer components (only a single component) compared with 5 components in a conventional optical amplifier system. Furthermore, less splicing is required to fabricate the optical amplifier system with highly integrated hybrid components 100. Consequently, the insertion loss introduced by the highly integrated hybrid component 100 in an optical amplifier system is significantly lower than that in a conventional optical amplifier system. Moreover, the highly integrated hybrid components 100 provides a much lower PDL and PMD compared with the discrete components used in the conventional optical amplifier system. Furthermore, as discussed above, a wider isolation bandwidth can be achieved by selecting the peak isolation wavelength of isolator-polarization beam deflector 131 and 139. Because of the configuration and use of fewer components, the hybrid component 100 also has a smaller footprint, preferably using a compact cylindrical package. As a result, management of the fibers of the network in which the hybrid component 100 is installed is made simpler. Finally, the use of fewer optical components as well as the selection of the less expensive C-lens for the dual fiber collimator 160 and the triple fiber collimator 110 lowers the cost. Consequently, better performance can be achieved at a lower cost.

A method and system has been disclosed for a more highly integrated hybrid component. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A highly integrated hybrid component comprising:
a triple fiber collimator for receiving a plurality of pump signals in a first direction and for outputting an optical signal in a second direction;
a dual isolator/polarization beam deflector optically coupled to the triple fiber collimator, the dual isolator/polarization beam deflector for transmitting the plurality of pump signals in the first direction, preventing a portion of the plurality of pump signals from traveling out of the triple fiber collimator in the second direction and providing the optical signal in the second direction; and
a dual fiber collimator for receiving the optical signal traveling in the second direction, the dual fiber collimator also for outputting the plurality of pump signals traveling in the first direction, the dual isolator/ polarization beam deflector preventing a portion of the optical signal from traveling out of the dual fiber collimator in the first direction.

2. The highly integrated hybrid component of claim 1 further comprising:
 a partial reflection plate, the dual isolator/polarization beam deflector located between the triple fiber collimator and the partial reflection plate; and
 wherein the dual fiber collimator further provides the optical signal to the partial reflection plate, receives a signal tap from the partial reflection plate and outputs the signal tap traveling in the first direction, the signal tap being a partially reflection portion of the optical signal.

3. The highly integrated hybrid component of claim 2 wherein the dual isolator/polarization beam deflector further includes a first polarization beam deflector and a second polarization beam deflector.

4. The highly integrated hybrid component of claim 3 wherein the first polarization beam deflector includes a first birefringent wedge, a first rotator, a second birefringent wedge and a first magnetic ring, the first rotator being between the first birefringent wedge and the second birefringent wedge the first birefringent wedge having a first optical axis and an angle, the second birefringent wedge having a second optical axis oriented forty-five degrees from the first optical axis and the angle.

5. The highly integrated hybrid component of claim 4 wherein the second polarization beam deflector includes a third birefringent wedge, a second rotator, a fourth birefringent wedge and a magnetic ring, the second rotator being between the third birefringent wedge and the fourth birefringent wedge, the third birefringent wedge having a third optical axis and the angle, the fourth birefringent wedge having a fourth optical axis oriented forty-five degrees from the third optical axis and the angle, the third optical axis being oriented ninety degrees from the second optical axis.

6. The highly integrated hybrid component of claim 5 wherein the plurality of power signals include a first power signal and a second power signal, the first power signal and the second power signal being separated by a second angle as the first power signal and the second power signal are incident upon the dual isolator/polarization beam deflector.

7. The highly integrated hybrid component of claim 6 wherein the first birefringent wedge, the second birefringent wedge, the third birefringent wedge and the fourth birefringent wedge have an ordinary index of refraction ($n_o$) and an extraordinary index of refraction ($n_e$) and wherein the angle ($\beta$) and the second angle ($\alpha$) obey the relationship:

$$\beta = 2\sin^{-1}(n_e \sin(\sin^{-1}(n_o/n_e \sin \alpha) - \alpha)) - 2\sin^{-1}(n_o \sin(\sin^{-1}(n_e/n_o \sin \alpha) - \alpha)).$$

8. The highly integrated hybrid component of claim 7 wherein the triple fiber collimator has a crossing distance, the crossing distance being greater than three times a thickness of the first birefringent wedge divided by the smaller of $n_o$ and $n_e$, plus two times a thickness of the rotator divided by a refractive index of the rotator, plus a distance between the second birefringent wedge and the third birefringent wedge.

9. The highly integrated hybrid component of claim 1 wherein the triple fiber collimator is a C-lens triple fiber collimator.

10. The highly integrated hybrid component of claim 1 wherein the dual fiber collimator is a C-lens dual fiber collimator.

11. A method for allowing an optical signal to be amplified, the method comprising the steps of:

(a) providing a plurality of pump signals traveling in a first direction to a triple fiber collimator;
(b) providing the optical signal traveling in to a dual fiber collimator;
(c) providing the optical signal from the dual fiber collimator to a partial reflection plate,
(d) providing the optical signal and the plurality of pump signals to a dual isolator/polarization beam deflector optically coupled to the triple fiber collimator and to the partial reflection plate, the optical signal being provided from the partial reflection plate, the plurality of pump signals being provided from the triple fiber collimator, the dual isolator/polarization beam deflector for transmitting the plurality of pump signals in the first direction, preventing a portion of the plurality of pump signals from traveling out of the triple fiber collimator in the second direction, providing the optical signal in the second direction and preventing a portion of the optical signal from traveling out of dual fiber collimator in the first direction;
(e) utilizing the triple fiber collimator to output the optical signal in a second direction;
(f) utilizing the dual fiber collimator also for outputting the plurality of pump signals traveling in the first direction.

12. The method of claim 11 further comprising the steps of:
(g) receiving a signal tap from the partial reflection plate, the signal tap being a partially reflection portion of the optical signal from the partial reflection plate; and
(h) outputting the signal tap traveling in the first direction.

13. The method of claim 11 wherein the dual isolator/polarization beam deflector further includes a first polarization beam deflector and a second polarization beam deflector.

14. The method of claim 13 wherein the first polarization beam deflector includes a first birefringent wedge, a first rotator, a second birefringent wedge and a first magnetic ring, the first rotator being between the first birefringent wedge and the second birefringent wedge the first birefringent wedge having a first optical axis and an angle, the second birefringent wedge having a second optical axis oriented forty-five degrees from the first optical axis and the angle.

15. The method of claim 14 wherein the second polarization beam deflector includes a third birefringent wedge, a second rotator, a fourth birefringent wedge and a magnetic ring, the second rotator being between the third birefringent wedge and the fourth birefringent wedge, the third birefringent wedge having a third optical axis and the angle, the fourth birefringent wedge having a fourth optical axis oriented forty-five degrees from the third optical axis and the angle, the third optical axis being oriented ninety degrees from the second optical axis.

16. The method of claim 15 wherein the plurality of power signals include a first power signal and a second power signal, the first power signal and the second power signal being separated by a second angle as the first power signal and the second power signal are incident upon the dual isolator/polarization beam deflector.

17. The method of claim 16 wherein the first birefringent wedge, the second birefringent wedge, the third birefringent wedge and the fourth birefringent wedge have an ordinary index of refraction ($n_o$) and an extraordinary index of refraction ($n_e$) and wherein the angle ($\beta$) and the second angle ($\alpha$) obey the relationship:

$\beta=2\sin^{-1}(n_e\sin(\sin^{-1}(n_o/n_e\sin\alpha)-\alpha))-2\sin^{-1}(n_o\sin(\sin^{-1}(n_e/n_o\sin\alpha)-\alpha))$.

18. The method of claim 17 wherein the triple fiber collimator has a crossing distance, the crossing distance being greater than three times a thickness of the first birefringent wedge divided by the smaller of $n_o$ and $n_e$, plus two times a thickness of the rotator divided by a refractive index of the rotator, plus a distance between the second birefringent wedge and the third birefringent wedge.

19. The method of claim 11 wherein the triple fiber collimator is a C-lens triple fiber collimator.

20. The method of claim 11 wherein the dual fiber collimator is a C-lens dual fiber collimator.

* * * * *